Dec. 11, 1962  H. C. MORTON  3,068,131
CLUTCH FACING
Filed Oct. 3, 1958  2 Sheets-Sheet 2
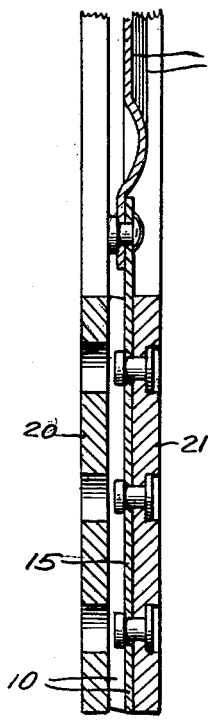
Fig. 3.
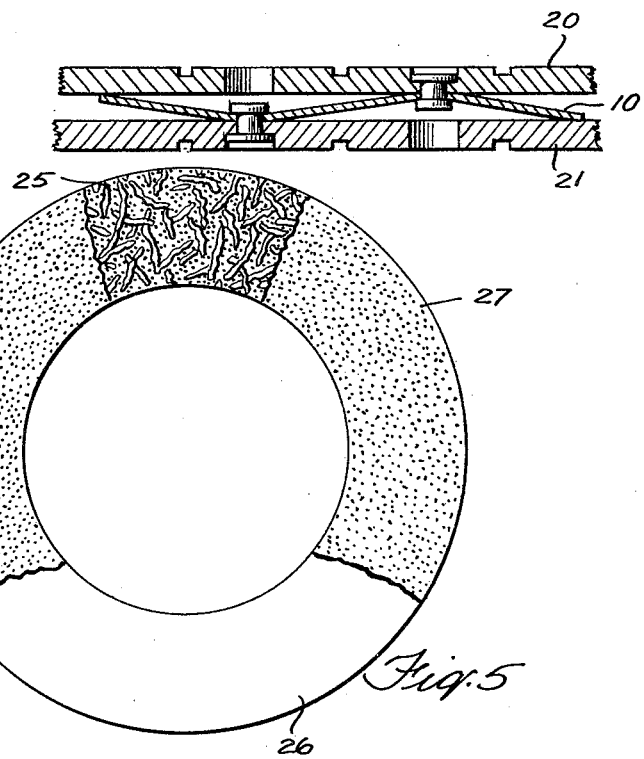
Fig. 4
Fig. 5
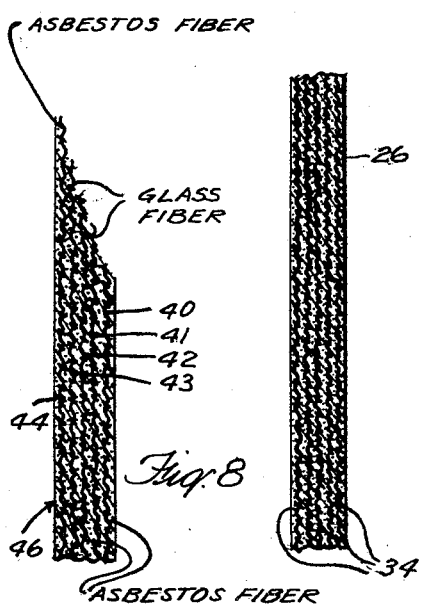
Fig. 8
Fig. 6
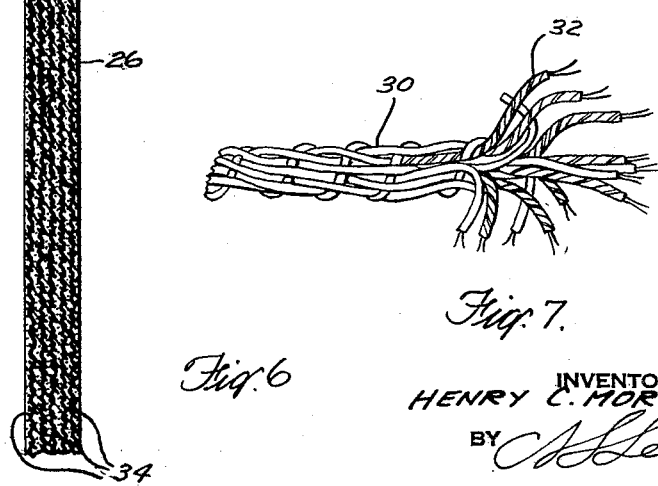
Fig. 7
INVENTOR
HENRY C. MORTON
BY
ATTORNEY 3,068,131
CLUTCH FACING
Henry C. Morton, Branford, Conn., assignor to The Russell Manufacturing Company, Middletown, Conn., a corporation of Connecticut
Filed Oct. 3, 1958, Ser. No. 765,233
1 Claim. (Cl. 154—52)

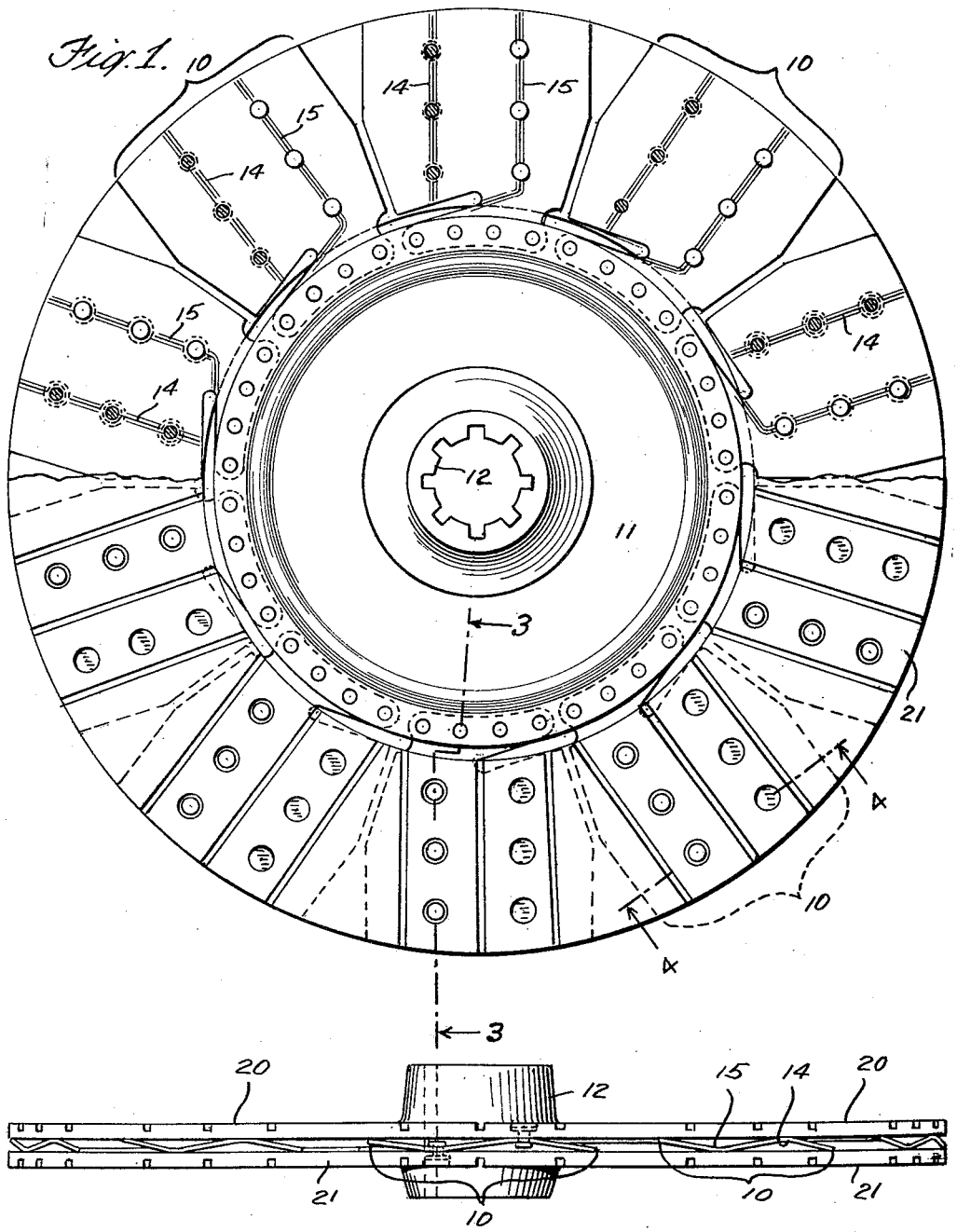

This invention relates to clutch facings for automotive use and the like and has for an object to provide a clutch facing which is suitable for use at high engine speeds.

Another object is to provide a clutch facing of the molded fabric type having a suitable reinforcement for withstanding rotational speeds of the order of 8000 r.p.m. or more and so constructed as to eliminate the tendency to buckle or warp when subjected to high temperatures.

Other objects and advantages will be apparent as the nature of the invention is more fully disclosed.

In the manufacture of clutch plates for the standard type of manually operated clutch as used on automobiles, tractors, busses, bulldozers, off-the-highway equipment, etc. it is necessary in order to develop the required heat resistance and high friction that the friction material which forms the clutch plate be composed of known heat-resistant fibers such as asbestos mixed with metals, resins and rubbers as binding agents. The whole mass is then pressed into the desired shape in a mold and cured while under pressure by applying the necessary heat.

Engines, particularly those used in trucks, have in recent years been constantly re-designed to produce more power, and this is mostly accomplished by the engines running at higher speeds. Currently these speeds have come to the point where the centrifugal force exerted on the friction material which is riveted to the clutch plate, is such that the friction material can no longer withstand the stresses imposed upon it and the result is disintegration of the clutch plate.

Generally speaking, speeds of 7000 r.p.m. or thereabouts on a clutch plate with an overall diameter of 13 inches are the maximum possible permissible engine speeds. Any speeds beyond this strain the friction material beyond its ability to hold itself together, with the resultant rupture or fracture and disintegration of the friction material on the clutch plate.

It is the purpose of this invention to permit higher speeds than 7000 r.p.m. with a clutch plate of friction material of at least 13 inches overall diameter.

There have been many attempts made to reinforce the back of the friction material before riveting it to the clutch plate assembly, such as bonding a sheet of metal onto the back of the friction material, or by using high strength fabrics such as glass and molding them in one operation with the clutch plate at the time it is heat-set and cured in the press.

However, the differences in the coefficient of expansion and the differences in the modulus of elasticity of the reinforcing elements cause a "buckling" of the friction material to the extent that the clutch cannot be disengaged. The movement of the clutch plates when the clutch is disengaged is relatively small and the friction material must stay flat. If it buckles, then some power is transmitted from the motor through the clutch and it is not possible to engage or disengage the gears.

Increased engine speeds can be obtained by adhering a metal sheet to the back of existing friction material or by using glass fabrics as a reinforcing agent on the back of the friction material. However, no satisfactory manufacturing process has heretofore been developed which will eliminate this buckling which is basically caused by the difference in characteristics of the two materials being used, particularly at high temperatures of operation.

This invention accordingly provides a method of reinforcing the friction material of the clutch facings in such a way that they can withstand the high forces exerted by the high speeds of the new engines and yet remain flat, so that the clutch can be freely disengaged.

In accordance with the present invention the friction facing may be formed in any conventional manner. For example, it may be composed of a spiral wound tape woven from asbestos yarn plied with one or more strands of metal wire impregnated with a friction compound, and molded under heat and pressure into the form of a ring of the required size. Such a facing is described more in detail in copending application Serial No. 649,229, filed March 28, 1957 (Patent No. 2,855,081, dated October 7, 1958), for Clutch Facing.

This facing ring is backed by a molded backing ring composed of a plurality of plies of woven glass fabric woven from spun glass fiber yarn, impregnated with a suitable bonding resin and molded and cured under heat and pressure.

The glass fabric backing ring and the friction facing ring are bonded together with an elastomeric bonding resin to form a unitary structure.

In this embodiment the glass fabric has a high tensile strength and prevents rupture of the friction facing material at high speeds. The glass fabric has a coefficient of expansion comparable with that of the friction facing, any differences in expansion being taken up by the elastomeric bonding resin without warping or buckling.

In a further embodiment of the invention the facing is built up in a plurality of superimposed plies in which the outer plies are composed of friction facing material such as that above described, or a flat woven asbestos fabric impregnated with a friction composition of the type above referred to, and the inner plies are composed of resin-impregnated glass fabric. The plies are bonded by a bonding resin and cured under heat and pressure to form a unitary structure.

The nature of the invention will be better understood by referring to the following description, taken in connection with the accompanying drawings in which certain specific embodiments have been set forth for purposes of illustration.

In the drawings:
FIG. 1 is a front elevation of the clutch plate;
FIG. 2 is a side elevation of the clutch plate with parts in section;
FIG. 3 is an enlarged fragmentary section taken on the line 3—3 of FIG. 1;
FIG. 4 is a fragmentary section taken on the line 4—4 of FIG. 1;
FIG. 5 is a front elevation on a smaller scale of a friction facing ring with parts broken away to show the various layers;
FIG. 6 is a diagrammatic view of the fabric layers forming the reinforcing ring;
FIG. 7 is a detail view of the tape from which the friction facing ring is formed; and
FIG. 8 is a diagrammatic view similar to FIG. 6 illustrating a further embodiment of the invention.

Referring to the drawings more in detail, the invention is shown as embodied in a friction facing ring for a clutch plate composed of a plurality of sectors 10 attached to a disc 11 carried by a splined hub 12. The sectors 10 are bent along radial lines to form ridges 14 on one side separated by ridges 15 on the other side which provide a certain amount of resilience as the clutch plate is compressed between opposing clutch elements not shown. The construction of the clutch plate is conventional and only so much thereof has been shown as is necessary to an understanding of the present invention.

A friction facing ring 20 is riveted to the ridges 14 on one side of the clutch plate and a similar friction facing ring 21 is riveted to the ridges 15 on the opposite side of the clutch plate.

In accordance with this invention such friction facing ring is composed of a molded fabric friction ring 25 and a molded fabric backing ring 26 which are bonded together by an elastomeric bonding resin 27 such as a natural or synthetic rubber.

The friction ring 25 is composed of a spirally wound tape 30 woven from yarn composed of asbestos fiber blended with cotton or rayon fibers to improve spinnability and plied with a metal strand 32 such as copper, bronze or brass.

The tape 30 is impregnated with a known friction compound such for example as a rubber composition containing powdered phenolic resin, sulfur, carbon black and a friction material such as powdered mica, metal powder, iron oxide, or the like. Examples of such compositions are given in the Walters Patent No. 2,196,570, dated April 9, 1940, for Clutch Friction Disk. The impregnated tape is wound to form a ring 25 of the required size, after which it is cured. The ring may for example be cured by heating at a temperature of the order of 350° F. for a period of eight minutes, under a pressure of the order of 125 tons, depending on the size of the ring, then baked at a temperature of the order of 375° F. to 400° F. under weights to maintain the ring in flat condition for a period of from seven to eight hours, or until the rubber has become completely vulcanized and the resin composition completely polymerized.

The backing ring 26 is composed of a plurality of plies 34 of a flat fabric composed of glass fiber yarn which has a relatively high tensile strength.

The fabric prior to molding is impregnated with a bonding resin, which may be a phenolic resin derived from the reaction of phenol, cresol or a homologue with formaldehyde under controlled condition or may comprise an epoxy resin. In the drying step the mixture is heated to remove the solvent and the resin content polymerized until a residual volatile content of 5% to 7% is attained.

After this operation the glass fabric is cut into rings 34. A series of three to six such rings, depending upon the fabric thickness of the discs, are placed upon one another, put in a press and heat-fused together in order to form a composite structure. The directions of the warp and weft yarns in successive layers are shifted so that as the laminates are built up the yarns extend in different directions.

The conversion of the resin into a thermostat form may be accomplished at a temperature of the order of 350° F. for eight minutes and at pressures of 10 tons to 100 tons, depending upon the area of the object being molded.

The resultant structure is a thin flat glass fabric laminate, solidly fused together, which has a very high strength and resistance to bursting when spun at high speeds.

The friction ring 25 is ground down on the back if necessary to reduce the thickness by an amount equal to the thickness of the glass reinforcing ring 26.

The friction facing ring 25 is adhered to the reinforcing ring 26 by setting up a bond of an elastic nature which can withstand the heat encountered during the life of the engine, and which has good adhesion between the glass reinforcing fabric and the friction material, yet is elastic enough to permit the different coefficients of expansion to exert themselves without causing buckling.

For this purpose the facing ring 25 and the backing ring 26 are coated on their adjacent faces with a bonding rubber composition 27, such as a natural or synthetic rubber cement in which acetone is the dissolving solvent. This cement is allowed to dry in an oven for one-half hour at 140° F., after which the reinforcing ring 26 is placed upon the facing ring, put in a mold, then in a press which can exert a pressure of fifty to one hundred tons and in which the temperature is 350° F. for a period of eight minutes. After this, the bonded clutch ring is removed from the mold and put in an oven under weights to keep it flat, and cured at a high temperature, about 375° F. for one hour.

This produces a flexible bond between the friction material and the reinforcing plastic laminate which will withstand the high temperatures involved and will stay flat under all conditions, yet give sufficient strength to the friction material so that speeds over 8000 r.p.m. can be attained without the friction material disintegrating.

In the embodiment of FIG. 8 the friction ring is composed of a plurality of plies 40 to 44 of flat woven fabric. The plies 40, 41 and 44 are composed of a fabric woven from asbestos yarn of the type above mentioned with or without metal strands and impregnated with a friction molding compound.

The plies 42 and 43 may be woven from a resin-impregnated glass fiber yarn as in the case of the rings 34 above mentioned.

The plies 40 to 44 are stacked and bonded, the stack being cured under heat and pressure to form a rigid friction facing ring 46.

In this embodiment the outer faces are composed of the same material and would have equal coefficients of expansion. The reinforcing plies are disposed between the friction plies and are bonded on both faces so that inequalities in expansion are compensated for without buckling or warping.

Alternatively the impregnated friction rings 40, 41 and 44 of FIG. 8 may be replaced by an extruded friction facing which is extruded onto the two surfaces of the reinforcing rings 42 and 43 and molded under heat and pressure.

A preferred composition for the extruded portion of the facing would be as follows: Medium length asbestos fiber, 55%; binder (a combination of phenolic resin and synthetic rubber), 18%; and the balance of the compound composed of conventional fillers such as carbon black, mica, various oxides or friction producing agents in an amount to complete the 100% composition.

The extruded composition may be precured into the form of a facing ring which is then applied to each side of the resin impregnated glass fiber fabric rings, after which the assembly is given a final curing under heat and pressure or the friction material may be extruded directly onto the impregnated glass fiber fabric rings and the assembly cured under heat and pressure in a single operation. In either event the glass fiber rings are embedded between the two friction facings to bond and reinforce the same.

Another type of composition which could be used in producing a facing of this type is known as Dry Mix. In this instance all the ingredients are tumbled together in a dry form, the binder being composed of a phenolic resin alone, in the amount of approximately 18%. The asbestos and filler content of the remainder being the same as listed for the extruded type. If this type of composition were used a weighed amount of mix would be placed in the mold, the treated glass rings placed on top of it and more dry mix composition added on top of the glass rings and the whole cold pressed to make a preform. This preform would then be hot pressed and cured in the manner set forth above.

Although a specific embodiment of the invention has been shown for purposes of illustration, it is to be understood that various changes and adaptations may be made therein as will be readily apparent to a person skilled in the art.

What is claimed is:

A clutch facing, comprising a molded fabric facing ring composed of a spirally wound tape woven from asbestos fiber yarn impregnated with a molding resin in cured and heat-set state containing friction material, and a reinforcing ring disposed on the back of said friction facing ring and bonded thereto by rubber cement, said reinforcing ring being composed of a plurality of plies of flat woven spun glass fabric impregnated with a phenolic molding resin in heat-set and cured state, said rubber cement being characterized by resilience to accommodate differences in expansion of said rings without buckling or warping.

References Cited in the file of this patent

UNITED STATES PATENTS

| | | |
|---|---|---|
| 1,180,503 | Kelley | Apr. 25, 1916 |
| 2,146,518 | Whitelaw | Feb. 7, 1939 |
| 2,150,937 | Novak | Mar. 21, 1939 |
| 2,196,570 | Walters | Apr. 9, 1940 |
| 2,277,602 | Novak | Mar. 24, 1942 |
| 2,413,346 | Hall | Dec. 31, 1946 |
| 2,554,548 | Albagnac | May 29, 1951 |
| 2,749,266 | Eldred | June 5, 1956 |